(12) United States Patent
Song et al.

(10) Patent No.: US 12,548,961 B2
(45) Date of Patent: Feb. 10, 2026

(54) AUTOCORRELATOR AND PULSE AMPLIFYING DEVICE INCLUDING SAME

(71) Applicant: ELECTRONICS AND TELECOMMUNICATIONS RESEARCH INSTITUTE, Daejeon (KR)

(72) Inventors: Dong Hoon Song, Daejeon (KR); Hong-Seok Seo, Daejeon (KR); Soo Jun Park, Daejeon (KR); Chul Huh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 769 days.

(21) Appl. No.: 17/978,795

(22) Filed: Nov. 1, 2022

(65) Prior Publication Data
US 2023/0291164 A1    Sep. 14, 2023

(30) Foreign Application Priority Data

Mar. 8, 2022  (KR) .................. 10-2022-0029432

(51) Int. Cl.
*H01S 3/00*   (2006.01)
*H01S 3/094*  (2006.01)
*H01S 3/23*   (2006.01)

(52) U.S. Cl.
CPC .......... *H01S 3/0071* (2013.01); *H01S 3/0057* (2013.01); *H01S 3/094076* (2013.01); *H01S 3/2308* (2013.01)

(58) Field of Classification Search
CPC ...... G01J 11/00; H01S 3/0014; H01S 3/0057; H01S 3/0071
See application file for complete search history.

(56) References Cited

U.S. PATENT DOCUMENTS

| | | | |
|---|---|---|---|
| 5,299,170 A | | 3/1994 | Shibata et al. |
| 5,590,148 A | * | 12/1996 | Szarmes ................. H01S 3/081 372/19 |
| 10,279,426 B2 | | 5/2019 | Estival et al. |
| 2014/0362376 A1 | | 12/2014 | Liu et al. |

(Continued)

FOREIGN PATENT DOCUMENTS

| | | |
|---|---|---|
| CN | 108007585 A | 5/2018 |
| JP | H0545230 A | 2/1993 |

(Continued)

*Primary Examiner* — Alexander P Gross
(74) *Attorney, Agent, or Firm* — Rabin & Berdo, P.C.

(57) ABSTRACT

An autocorrelator and a pulse amplifying device including the same are provided. The autocorrelator includes a parabolic mirror configured to transmit and reflect pulse laser beam, a prism on one side of the parabolic mirror and configured to split the pulse laser beam, a first lower retro-reflector under the prism and provided at a first distance from the prism to reflect a portion of the pulse laser beam, a first upper retro-reflector on the prism, provided at a second distance different from the first distance from the prism, and configured to reflect another portion of the pulse laser beam to generate a first time difference between pulses of the pulse laser beam upper retro-reflector, and a first sensor under the parabolic mirror and configured to receive the pulse laser beam to detect a pulse width of the pulse laser beam.

20 Claims, 8 Drawing Sheets

(56) References Cited

U.S. PATENT DOCUMENTS

2018/0135970 A1\* 5/2018 Mazumdar ............ G01J 3/2823
2019/0128733 A1 5/2019 Kang et al.
2021/0405224 A1 12/2021 Kim et al.

FOREIGN PATENT DOCUMENTS

| JP | H07270246 A | 10/1995 |
| KR | 20100065971 A | 6/2010 |
| KR | 10-2018-0048670 A | 5/2018 |

\* cited by examiner

AUTOCORRELATOR AND PULSE AMPLIFYING DEVICE INCLUDING SAME

CROSS-REFERENCE TO RELATED APPLICATIONS

This U.S. non-provisional patent application claims priority under 35 U.S.C. § 119 of Korean Patent Application No. 10-2022-0029432, filed on Mar. 8, 2022, the entire contents of which are hereby incorporated by reference.

BACKGROUND

The present disclosure relates to a pulse amplifying device, and more particularly, to an autocorrelator and a pulse amplifying device including the same.

The technological development of the industry has required precision and high productivity in the field using a laser beam. The ultra-short laser beam shows different characteristics from the conventional laser beam. For example, the ultra-short laser beam can avoid thermal effects or thermal deformation occurring in conventional laser processing. In addition, the ultra-short laser beam may process the inside without damaging the surface of the medium. Therefore, the ultra-short laser beams are being used in fields requiring precise and fine processing (semiconductors, electronic chips, medical care, etc.).

SUMMARY

The present disclosure provides an autocorrelator capable of implementing the simplification of elements and a laser device including the same.

An embodiment of the inventive concept provides an autocorrelator including: a parabolic mirror configured to transmit and reflect pulse laser beam; a prism on one side of the parabolic mirror and configured to split the pulse laser beam; a first lower retro-reflector disposed under the prism and provided at a first distance from the prism to reflect a portion of the pulse laser beam; a first upper retro-reflector disposed on the prism, provided at a second distance different from the first distance from the prism, and configured to reflect another portion of the pulse laser beam to generate a first time difference between pulses of the pulse laser beam; and a first sensor disposed under the parabolic mirror and configured to receive the pulse laser beam to detect a pulse width of the pulse laser beam.

In an embodiment, the first sensor may include a two-photon sensor

In an embodiment, the autocorrelator may further include a first harmonic generation plate between the parabolic mirror and the first sensor.

In an embodiment, the prism may include: a lower prism; and an upper prism disposed on the lower prism and having a refractive index different from that of the lower prism.

In an embodiment, the lower prism may include glass, wherein the upper prism may include silica.

In an embodiment, the autocorrelator may further include: first and second beam splitters provided on other sides of the lower prism and the upper prism facing the parabolic mirror; a second lower retro-reflector disposed below the first and second beam splitters and provided at a third distance from the first beam splitter to reflect a portion of the pulse laser beam; and a second upper retro-reflector disposed on the first and second beam splitters, provided at a fourth distance different from the third distance from the second beam splitter, and configured to reflect another portion of the pulse laser beam to generate a second time difference between pulses of the pulse laser beam.

In an embodiment, the autocorrelator may further include a second sensor disposed on the other side of the first and second beam splitters.

In an embodiment, the autocorrelator may further include a second harmonic generation plate disposed between the first and second beam splitters and the second sensor.

In an embodiment, the autocorrelator may further include a convex lens disposed between the second harmonic generation plate and the first and second beam splitters.

In an embodiment, the autocorrelator may further include a polarizing plate disposed between the convex lens and the second beam splitter.

In an embodiment of the inventive concept, an autocorrelator includes: a parabolic mirror configured to transmit and reflect pulse laser beam; a prism disposed on one side of the parabolic mirror to split the pulse laser beam; a first lower retro-reflector disposed under the prism and provided at a first distance from the prism to reflect a portion of the pulse laser beam; a first upper retro-reflector portion disposed on the prism, provided at a second distance different from the first distance from the prism, and configured to reflect another portion of the pulse laser beam to generate a first time difference between pulses of the pulse laser beam; a first sensor disposed under the parabolic mirror and configured to receive the pulse laser beam and detect a pulse width of the pulse laser beam; first and second beam splitters disposed on the other side of the prism facing the parabolic mirror; a second lower retro-reflector disposed below the first and second beam splitters and provided at a third distance from the first beam splitter to reflect a portion of the pulse laser beam; and a second upper retro-reflector disposed above the first and second beam splitters, provided at a fourth distance different from the third distance from the second beam splitter, and configured to reflect another portion of the pulse laser beam to reflect another portion of the pulse laser beam to generate a second time difference between pulses of the pulse laser beam.

In an embodiment, the prism may include: a lower prism; and an upper prism disposed on the lower prism and having a refractive index different from that of the lower prism.

In an embodiment, the autocorrelator may further include partially reflective coating layers on one side of the lower prism and the upper prism adjacent to the first lower retro-reflector and the first upper retro-reflector.

In an embodiment, the autocorrelator may further include anti-reflective coating layers disposed on the other sides of the second lower retro-reflector and the lower prism and the upper prism adjacent to the second upper retro-reflector.

In an embodiment, the autocorrelator may further include highly reflective coating layers provided in bottoms of the lower prism and the upper prism and arranged in a direction parallel to the pulse laser beam.

In an embodiment of the inventive concept, a pulse amplifying device includes: a pulse oscillator configured to generate pulses of a pulse laser beam; an expander disposed adjacent to the pulse oscillator and expanding a pulse width of the pulse laser beam; a compressor disposed adjacent to the expander and configured to compress the pulse width of the pulse laser beam; and an autocorrelator disposed adjacent to the compressor and configured to adjust the pulse width by measuring the pulse width, wherein the autocorrelator includes: a parabolic mirror configured to transmit and reflect pulse laser beam; a prism disposed on one side of the parabolic mirror and configured to split the pulse laser beam; a first lower retro-reflector disposed under the prism and provided at a first distance from the prism to reflect a portion of the pulse laser beam; a first upper retro-reflector disposed on the prism, provided at a second distance different from the first distance from the prism, and configured to reflect another portion of the pulse laser beam to generate a first time difference between pulses of the pulse laser beam upper retro-reflector; and a first sensor disposed under the parabolic mirror and configured to receive the pulse laser beam to detect a pulse width of the pulse laser beam.

In an embodiment, the pulse amplifying device may further include an amplifier disposed between the expander and the compressor, and configured to amplify an intensity of the pulse laser beam.

In an embodiment, the prism may include: a lower prism; and an upper prism disposed on the lower prism and having a refractive index different from that of the lower prism.

In an embodiment, the lower prism may include glass, wherein the upper prism may include silica.

In an embodiment, the pulse amplifying device may further include: first and second beam splitters provided on other sides of the lower prism and the upper prism facing the parabolic mirror; a second lower retro-reflector disposed below the first and second beam splitters and provided at a third distance from the first beam splitter to reflect a portion of the pulse laser beam; and a second upper retro-reflector disposed on the first and second beam splitters, provided at a fourth distance different from the third distance from the second beam splitter, and configured to reflect another portion of the pulse laser beam to generate a second time difference between pulses of the pulse laser beam.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Hereinafter, embodiments of the inventive concept will be described in detail with reference to the accompanying drawings. Advantages and features of the inventive concept, and a method of achieving them, will become apparent with reference to the embodiments described below in detail in conjunction with the accompanying drawings. However, the inventive concept is not limited to the embodiments described herein, and may be embodied in different forms. Rather, the embodiments introduced herein are provided so that this disclosure may be thorough and complete and the spirit of the inventive concept may be sufficiently conveyed to those skilled in the art, and the inventive concept is only defined by the scope of the claims. Like reference numerals refer to like elements throughout the specification.

The terms used in this specification are for describing embodiments and are not intended to limit the inventive concept. In this specification, the singular form also includes the plural form unless specifically stated in the phrase. As used in the specification, in relation to 'comprises' and/or 'comprising', the mentioned elements, steps, operations and/or elements do not exclude the presence or addition of one or more other elements, steps, operations and/or elements. Also, in the specification, chamber, thin film, and coating may be understood in general semiconductor and device terms. Since this is according to a preferred embodiment, reference signs provided in the order of description are not necessarily limited to the order.

Figure 1:
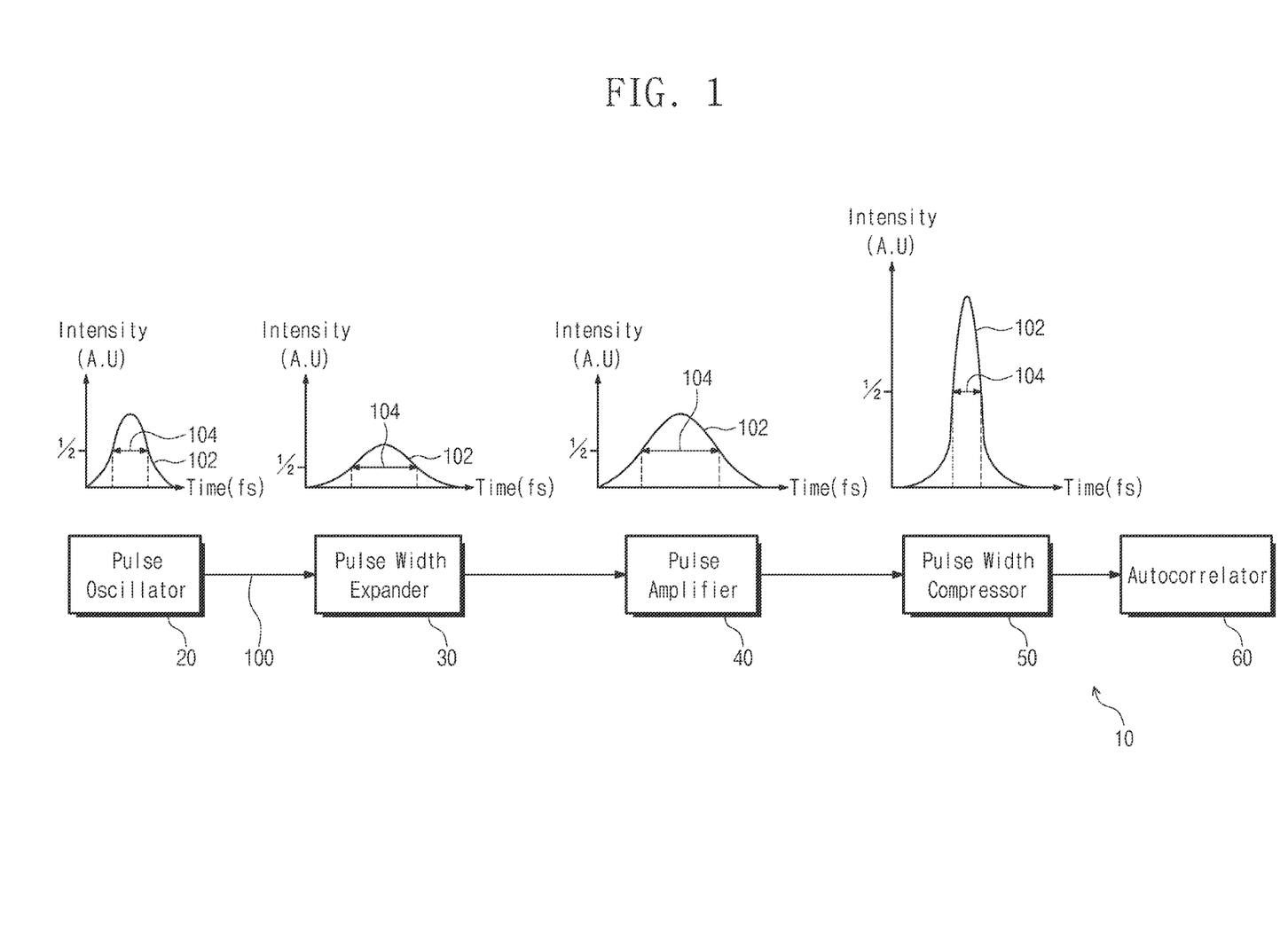
FIG. 1 is a view showing a pulse amplifying device according to the concept of the inventive concept.

FIG. 1 shows a pulse amplifying device 10 according to the concept of the inventive concept.

Referring to FIG. 1, the pulse amplifying device 10 may include a pulse oscillator 20, a pulse width expander 30, a pulse amplifier 40, a pulse width compressor 50, and an autocorrelator 60. The pulse oscillator 20 may generate the pulse laser beam 100. For example, the pulse laser beam 100 may have about 106 ultrashort pulses 102 per second. The pulse width expander 30 may expand the pulse width 104 of the pulse laser beam 100. Pulse width 104 may be defined as a time interval in which the intensity and/or amplitude are halved at the rise and fall times of pulse 102. The intensity of the pulse 102 may be varied in the pulse width expander 30, the pulse amplifier 40, and the pulse width compressor 50. The pulse width expander 30 may expand the pulse width 104 for each wavelength band of the pulse laser beam 100. The intensity of the pulse 102 may be reduced. For example, the pulse width expander 30 may reduce the intensity of the pulse laser beam 100 below a damage threshold of the second gain medium 46 of FIG. 4 of the pulse amplifier 40. The pulse amplifier 40 may amplify the intensity of the pulse laser beam 100. The pulse width compressor 50 may compress the pulse width 104 of the pulse laser beam 100. For example, the intensity of the pulse laser beam 100 in the pulse width compressor 50 may be increased to about 105 times to about 106 times or more than the intensity of the pulse laser beam 100 in the pulse oscillator 20. The autocorrelator 60 may be disposed on the other side of the pulse width compressor 50 opposite to the pulse amplifier 40. The autocorrelator 60 may measure the pulse width 104 to adjust the pulse width 104.

Figure 2:
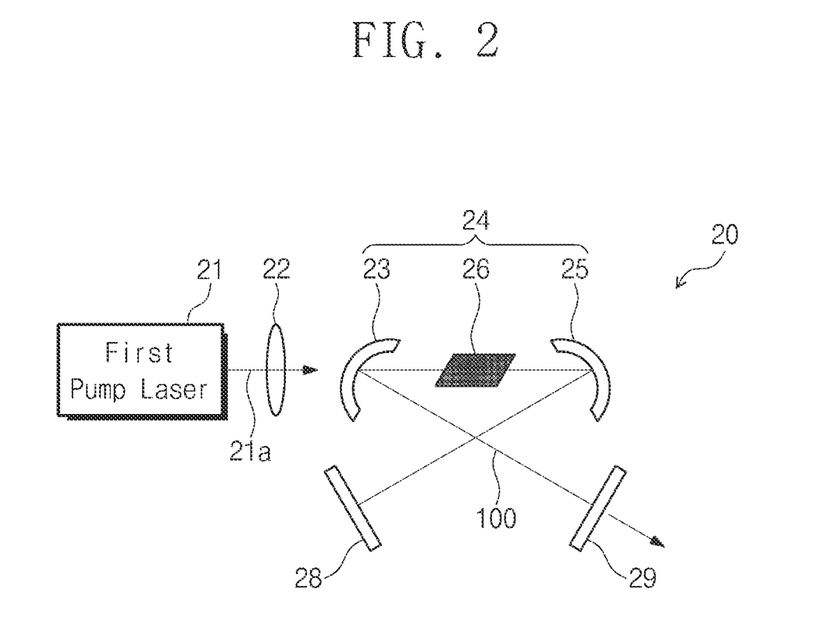
FIG. 2 is a cross-sectional view illustrating an example of the pulse oscillator of FIG. 1.

FIG. 2 shows an example of the pulse oscillator 20 of FIG. 1.

Referring to FIG. 2, the pulse oscillator 20 may include a first pump laser 21, a first resonator 24, a first chirped mirror 28, and a first output mirror 29. The first pump laser 21 may generate the first pump light 21a. The first pump light 21a may be provided to the first resonator 24 by the pump light focusing lens 22. The first resonator 24 and the first chirped mirror 28 may generate a pulse laser beam 100 from the pump light 21a. For example, the first resonator 24 may include first and second concave mirrors 23 and 25, and a first gain medium 26. The first and second concave mirrors 23 and 25 may reflect the pulse laser beam 100. Alternatively, the first and second concave mirrors 23 and 25 may amplify the intensity of the pulse laser beam 100. The first gain medium 26 may be disposed between the first and second concave mirrors 23 and 25. The first gain medium 26 may oscillate the pulse laser beam 100. The first chirped mirror 28 may be disposed outside the extension of the first and second concave mirrors 23 and 25 and the first gain medium 26. For example, the pulse laser beam 100 may be transmitted between the second concave mirror 25 and the first chirped mirror 28. The first chirped mirror 28 may generate a pulse 102 of a pulse laser beam 100. For example, the chirped mirror 28 may vibrate at several to several tens of MHz. The first concave mirror 23 may provide a pulse laser beam 100 to the first output mirror 29. The first output mirror 29 may output the pulse laser beam 100 to the pulse width expander 30.

Figure 3:
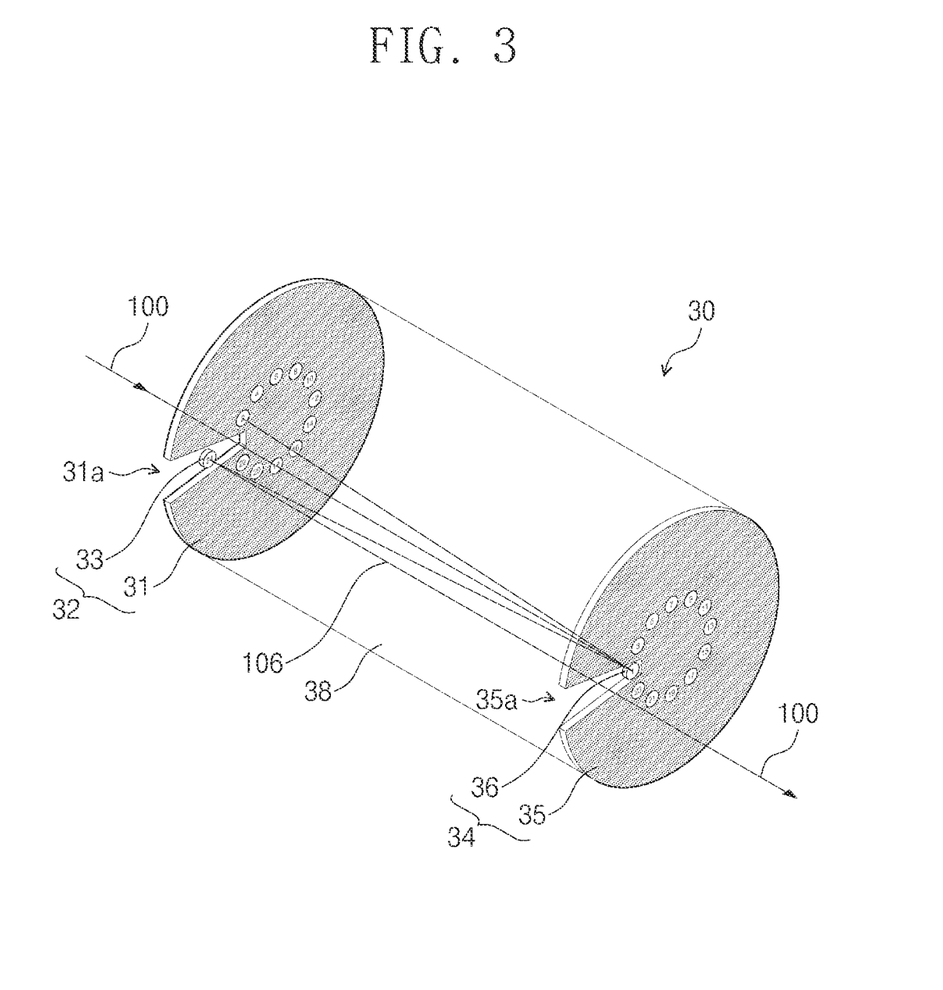
FIG. 3 is a perspective view illustrating an example of the pulse width expander of FIG. 1.

FIG. 3 shows an example of the pulse width expander 30 of FIG. 1.

Referring to FIG. 3, the pulse width expander 30 may include a first multiple reflection mirror 32, a second multiple reflection mirror 34, and a group delay dispersion block 38. The first and second multiple reflection mirrors 32 and 34 may reflect the pulse laser beam 100 multiple times. The group delay dispersion block 38 may be disposed between the first and second multiple reflection mirrors 32 and 34. The group delay dispersion block 38 may increase the pulse width 104 of the pulse laser beam 100.

The first and second multiple reflection mirrors 32 and 34 may be spaced apart from each other. The first and second multiple reflection mirrors 32 and 34 may multiple reflect the pulse laser beam 100. For example, the first and second multiple reflection mirrors 32 and 34 may reflect the pulse laser beam 100 about 24 times. "1"-"24" in FIG. 3 may correspond to reflection points of the pulse laser beam 100. The distance between the first and second multiple reflection mirrors 32 and 34 may be about 33.5 cm. The pulse laser beam 100 may travel a distance of about 8 (24*33.5 cm) m. The pulse laser beam 100 may pass through the group delay dispersion block 38. The group delay dispersion block 38 may have multiple paths 106 of the pulse laser beam 100. The multiple paths 106 may be spatially parallel without intersecting within the group delay dispersion block 38. The multiple paths 106 may extend the transmission and/or refraction length of the pulse laser beam 100 within the group delay dispersion block 38 without length extension of the group delay dispersion block 38. Accordingly, the first and second multiple reflection mirrors 32 and 34 and the group delay dispersion block 38 may maximize the spatial efficiency of the pulse width expander 30.

The first multiple reflection mirror 32 may include a first large-area mirror 31 and a first small-area mirror 33. According to an example, the first large-area mirror 31 may include a concave mirror. The first large-area mirror 31 may have a radius of curvature of about 5 m. The first large-area mirror 31 may have a first side hole 31a. The first small-area mirror 33 may be disposed in the first large-area mirror 31. The first small-area mirror 33 may be disposed in the first side hole 31a. For example, the first small-area mirror 33 may include a flat-panel mirror. The pulse laser beam 100 may pass through the first multiple reflection mirror 32 through the first side hole 31a.

The second multiple reflection mirror 34 may include a second large-area mirror 35 and a second small-area mirror 36. According to an example, the second large-area mirror 35 may include a plane mirror. The second large-area mirror 35 may have a second side hole 35a. The second small-area mirror 36 may have a smaller area than the second large-area mirror 35. The second small-area mirror 36 may be disposed in the second side hole 35a. For example, the second small-area mirror 36 may include a flat-panel mirror. The pulse laser beam 100 may pass through the second multiple reflection mirror 34 through the second side hole 35a.

The group delay dispersion block 38 may be disposed between the first and second multiple reflection mirrors 32 and 34. According to one example, the group delay dispersion block 38 may include a dielectric cylinder. The group delay dispersion block 38 may include silicon oxide. The group delay dispersion block 38 may have a positive GDD value for the pulse laser beam 100. For example, when the pulse laser beam 100 passes through the group delay dispersion block 38, the transmission time may vary for each wavelength band of the pulse laser beam 100. This is because the group delay dispersion block 38 has a different refractive index for each wavelength band of the pulse laser beam 100. The group delay dispersion block 38 may have group velocity dispersion of the wavelength of the pulse laser beam 100. A long wavelength of the pulse laser beam 100 may extend to a front portion of the pulse 102, and a short wavelength of the pulse laser beam 100 may extend to a rear portion of the pulse 102, with respect to the time axis. Accordingly, the pulse width 104 may be extended over the entire wavelength band of the pulse laser beam 100.

The group velocity dispersion may correspond to a phase change of the pulse laser beam 100 in the group delay dispersion block 38. When the phase change of the pulse laser beam 100 is a function for the frequency component of the pulse laser beam 100, the transit time $\tau(\omega)$ of the pulse laser beam 100 of each frequency component may be expressed by Equation 1 as follows.

$$\tau(\omega) = \frac{d\psi}{d\omega} \quad \text{[Equation 1]}$$

$\psi(\omega)$ be expressed by Equation 2 as follows if Taylor expansion is performed with respect to the center frequency of the pulse laser beam 100.

$$\psi(\omega) = \psi_0 + \frac{d\psi}{d\omega}\bigg|_{\omega_0} (\omega - \omega_0) + \frac{1}{2}\frac{d^2\psi}{d\omega^2}\bigg|_{\omega_0} (\omega - \omega_0)^2 \ldots \quad \text{[Equation 2]}$$

As an initial phase of the first term $\psi_0$ pulse laser beam 100, it may be an absolute phase of a center frequency of the pulse laser beam 100. The second term of $$\frac{d\psi}{d\omega}\bigg|_{\omega_0} (\omega - \omega_0)$$

may be the group velocity of the pulse laser beam 100, that is, the time required for the pulse laser beam 100 of the center frequency to pass through the group delay dispersion block 38. The third term of $$\frac{1}{2}\frac{d^2\psi}{d\omega^2}\bigg|_{\omega_0} (\omega - \omega_0)^2$$

is a term representing a linear change of $\tau(\omega)$ according to the frequency of the pulse laser beam 100 and may be a group delay dispersion (GDD) value. The GDD value may be proportional to a linear change of $\tau(\omega)$ according to the frequency of the pulse laser beam 100. For example, as the GDD value increases, the linear change of $\tau(\omega)$ may be large. The group delay dispersion block 38 may determine the GDD value of the pulse laser beam 100. The total group delay dispersion of the pulse laser beam 100 may correspond to the product of the GDD value of the group delay dispersion block 38 and the traveling distance of the pulse laser beam 100 in the group delay dispersion block 38. Although not shown in the drawing, the function τ(ω) may include third order dispersion to Nth order dispersion. When the GDD value is calculated, the third order dispersion to the Nth order dispersion may have little effect on the group velocity change of the pulse laser beam 100.

Meanwhile, the pulse 102 of the pulse laser beam 100 may have a bell-shaped Gaussian distribution. The extended pulse width of the pulse laser beam 100 by the group delay dispersion block 38 may be calculated from Equation 3 and is represented by a GDD value and a variable of the input pulse width.

$$\Delta t = \tau_0 \sqrt{1 + \frac{(4\log(2)GDD)^2}{\tau_0^4}}$$ [Equation 3]

Here, $\Delta t$ is the extended pulse width, and $\tau_0$ is the input pulse width. The input pulse width may correspond to $$\frac{c}{\lambda_0^2} \Delta\lambda \times \Delta t = 0.441$$

according to the uncertainty principle. $\lambda_0$ may be the center wavelength of the pulse laser beam 100. c may be the speed of light (3×108 m/s). $\Delta\lambda$ may be a full width half maximum of the wavelength of the pulse laser beam 100. The extended pulse width $\Delta t$ may be calculated by the central wavelength $\lambda_0$ of the pulse laser beam 100 and the half width $\Delta\lambda$. For example, if the central wavelength $\lambda_0$ is 800 nm and the pulse laser beam 100 having a half width $\Delta\lambda$ of 100 nm passes through the group delay dispersion block 38 8 m, the pulse width 104 of the pulse laser beam 100 may extend to about 388 picoseconds (ps). Accordingly, the pulse width expander 30 may effectively expand the pulse width 104 by using the multiple paths 106 of the group delay dispersion block 38.

Figure 4:
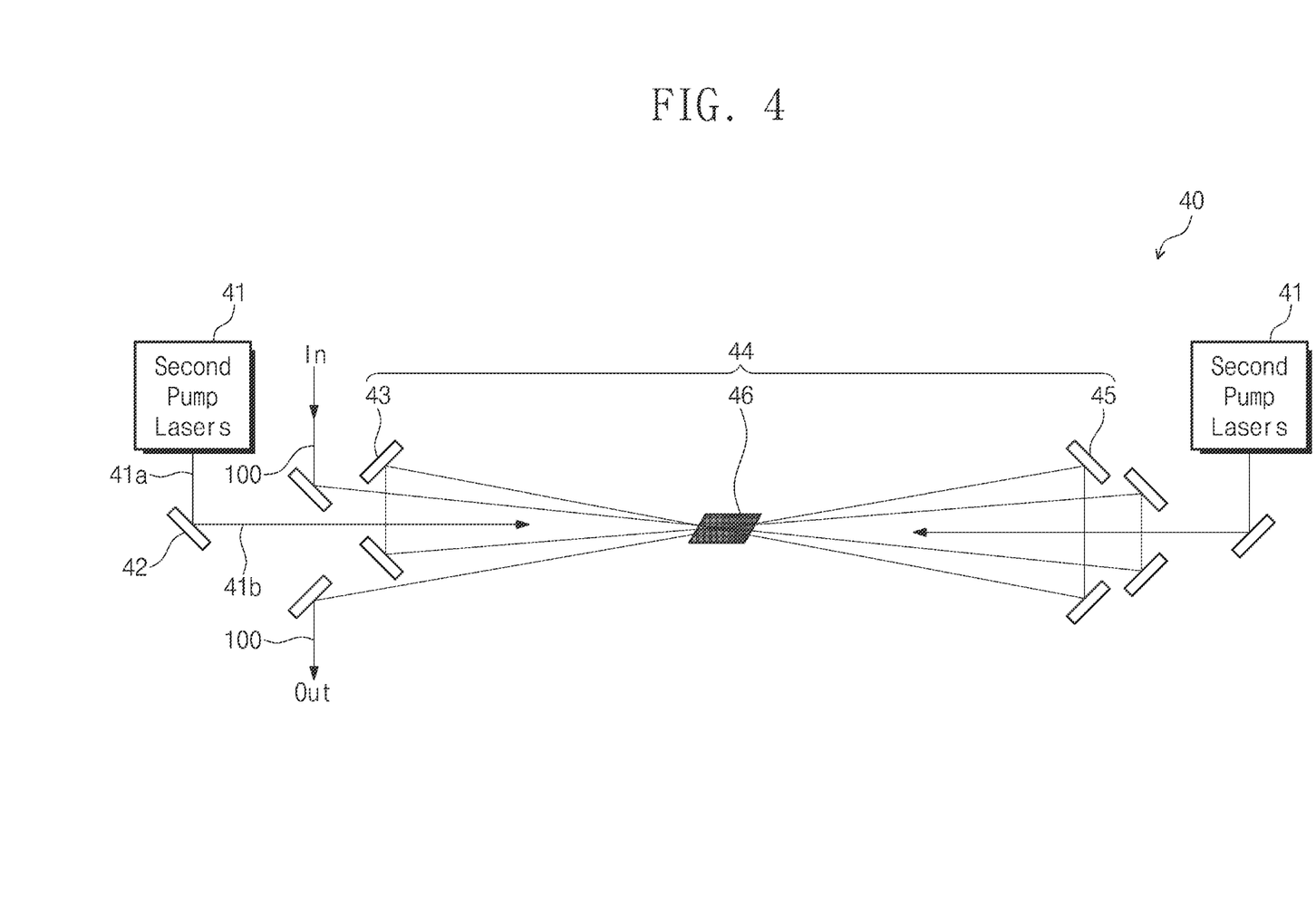
FIG. 4 is a cross-sectional view illustrating an example of the pulse amplifier of FIG. 1.

FIG. 4 shows an example of the pulse amplifier 40 of FIG. 1.

Referring to FIG. 4, the pulse amplifier 40 may include second pump lasers 41, second chirped mirrors 42, and a second resonator 44. The second pump lasers 41 may be disposed on both sides of the second chirped mirrors 42 and the second resonator 44. The second pump lasers 41 may generate the second pump light 41a. The second chirped mirrors 42 may chirp the second pump light 41a to provide the pulse pumping light 41b to the second resonator 44. The frequency of the pulse pumping light 41b may be the same as the frequency of the pulse laser beam 100. The second resonator 44 may amplify the intensity of the pulse laser beam 100. According to an example, the second resonator 44 may include first mirrors 43, second mirrors 45, and a second gain medium 46. The first mirrors 43 and the second mirrors 45 may be disposed to face each other. The second gain medium 46 may be disposed between the first mirrors 43 and the second mirrors 45. The second gain medium 46 may include the same material as the first gain medium 26. Whenever the pulse laser beam 100 passes through the second gain medium 46, the intensity of the pulse laser beam 100 may gradually increase. On the other hand, the pulse width 104 of the pulse laser beam 100 in the pulse width expander 30 and the pulse amplifier 40 may be the same.

Figure 5:
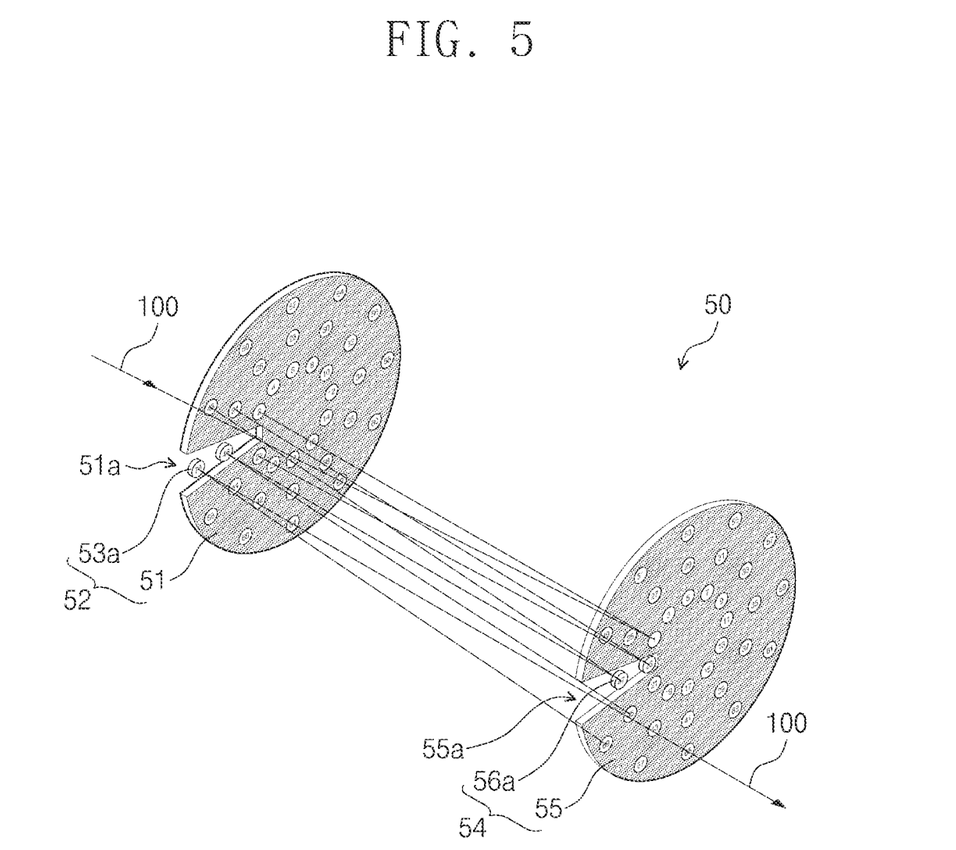
FIG. 5 is a perspective view illustrating an example of the pulse width compressor of FIG. 1.

FIG. 5 shows an example of the pulse width compressor 50 of FIG. 1.

Referring to FIGS. 3 to 5, the pulse width compressor 50 may include third and fourth multiple reflection mirrors 52 and 54. The third and fourth multiple reflection mirrors 52 and 54 may be disposed to face each other. According to an example, the third and fourth multiple reflection mirrors 52 and 54 may include group delay dispersion mirrors that reflect the pulse laser beam 100. The third and fourth multiple reflection mirrors 52 and 54 may have a GDD value opposite to the GDD value of the group delay dispersion block 38 with respect to the pulse laser beam 100. For example, the third and fourth multiple reflection mirrors 52 and 54 may have negative GDD values.

Although not shown in the drawing, each of the third and fourth multiple reflection mirrors 52 and 54 may include low refractive dielectric layers and high refractive dielectric layers. The low refractive dielectric layers may have the same refractive index as the group delay dispersion block 38. The low refractive dielectric layers may include silicon oxide ($SiO_2$) having a refractive index of about 1.4. High refractive dielectric layers may be disposed between the low refractive dielectric layers. The high refractive dielectric layers may have a higher refractive index than the refractive index of the low refractive dielectric layers. The high refractive dielectric layers may include titanium oxide ($TiO2$) having a refractive index of about 1.9. The thicknesses of the low refractive dielectric layers and the high refractive dielectric layers may be different. For example, the low refractive dielectric layers may have a thickness of about ¼ with respect to the wavelength of the pulse laser beam 100. The high refractive dielectric layers may have a thickness of about ½ the wavelength of the pulse laser beam. When the pulse laser beam has a wavelength of about 800 nm, the low refractive dielectric layers may have a thickness of about 200 nm, and the high refractive dielectric layer may have a thickness of about 400 nm.

The third multiple reflection mirror 52 may include a third large-area mirror 51 and third small-area mirrors 53. According to an example, the third large-area mirror 51 may include a concave mirror. The third large-area mirror 51 may have the same radius of curvature as the first large-area mirror 31. The third large-area mirror 51 may have a third hole 51a. The third small-area mirrors 53 may be disposed in the third large-area mirror 51. The third small-area mirrors 53 may be fixed in the third hole 51a.

The fourth multiple reflection mirror 54 may include a fourth large-area mirror 55 and fourth small-area mirrors 56. According to an example, the fourth large-area mirror 55 may include a flat mirror. The fourth large-area mirror 55 may have a fourth hole. The fourth small-area mirrors 56 may be disposed in the fourth large-area mirror 55. The fourth small-area mirrors 56 may be fixed in the fourth hole 55a.

The pulse laser beam 100 may pass through the third hole 51a and be reflected by the fourth large-area mirror 55. Alternatively, the pulse laser beam 100 may pass through the fourth hole 55a after being reflected by the third small-area mirror 53.

For example, when the pulse laser beam 100 has a wavelength of about 800 nm, the pulse laser beam 100 may have a GDD value of about −2,000 fs2 whenever it is reflected by third and fourth large-area mirrors 51 and 55, and the third and fourth small-area mirrors 53 and 56. The third and fourth large-area mirrors 51 and 55 and the third and fourth small-area mirrors 53 and 56 may reflect the pulse laser beam 100 about 70 times. The third and fourth large-area mirrors 51 and 55 and the third and fourth small-area mirrors 53 and 56 may compress the pulse width 104 of the pulse laser beam 100 to a GDD value of −144,000 fs2 in total. The pulse width 104 of the pulse laser beam 100 having a full width at half maximum (Δλ) of about 100 nm may be compressed to about −42 ps.

Figure 6:
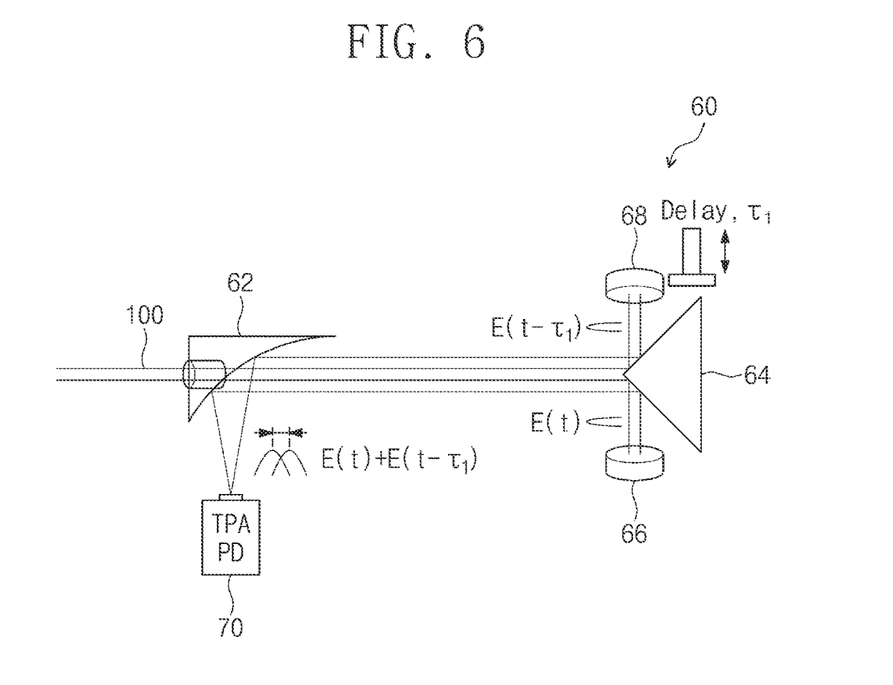
FIG. 6 is a cross-sectional view showing an example of the autocorrelator of FIG. 1.

FIG. 6 shows an example of the autocorrelator 60 of FIG. 1.

Referring to FIG. 6, the autocorrelator 60 may include a parabolic mirror 62, a prism 64, a first lower retro-reflector 66, a first upper retro-reflector 68, and a first sensor 70.

The parabolic mirror 62 may be provided on one side of the prism 64. The parabolic mirror 62 may transmit the pulse laser beam 100 through the prism 64 and reflect the pulse laser beam 100 to the first sensor 70. The parabolic mirror 62 may have a paraboloid directed towards the prism 64.

The prism 64 may be provided on one side of the parabolic mirror 62. The prism 64 may be provided between the first lower retro-reflector 66 and the first upper retro-reflector 68. The prism 64 may separate and/or split the pulse laser beam 100 to reflect the first lower retro-reflector 66 and the first upper retro-reflector 68. In addition, the prism 64 may reflect the pulse laser beam 100 back to the parabolic mirror 62. The prism 64 may have a triangular cross-sectional shape.

A first lower retro-reflector 66 may be provided under the prism 64. The first lower retro-reflector 66 may be provided at a first distance from the prism 64. The first lower retro-reflector 66 may reflect a portion of the pulse laser beam 100 of E(t) to the prism 64.

The first upper retro-reflector 68 may be provided on top of the prism 64. The first upper retro-reflector 68 may be provided at a second distance from the prism 64. The second distance may be adjusted differently from the first distance. The first upper retro-reflector 68 may generate a first time difference $\tau1$ of the pulse laser beam 100 by reflecting another portion of the pulse laser beam 100 of E(t−τ1). The pulse laser beam 100 may be interfered with in the parabolic mirror 62 or the prism 64.

The first sensor 70 may be disposed under the parabolic mirror 62. The first sensor 70 may detect the pulse laser beam 100. Although not shown in the drawing, the control unit (not shown) may acquire and/or determine the pulse width 104 of the pulse laser beam 100 by using the detection signal of the first sensor 70. The pulse width 104 may be obtained by interfering light of the pulse laser beam 100 having a first time difference $\tau1$. The control unit may control the pulse width compressor 50 to adjust the pulse width 104.

Figure 7:
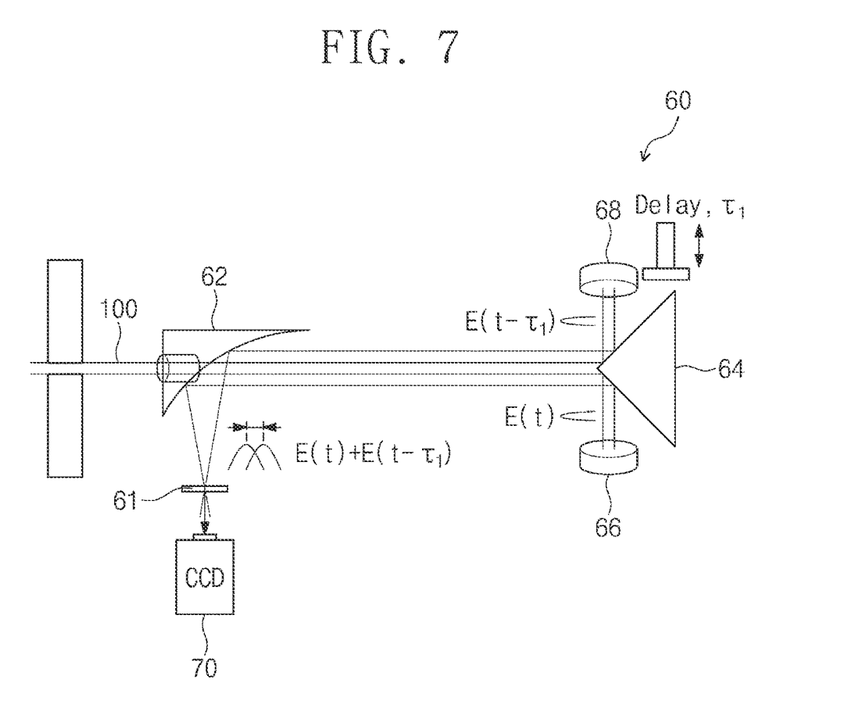
FIG. 7 is a cross-sectional view showing an example of the autocorrelator of FIG. 1.

FIG. 7 shows an example of the autocorrelator 60 of FIG. 1.

Referring to FIG. 7, the autocorrelator 60 may further include a first harmonic generation plate 61. The parabolic mirror 62, the prism 64, the first lower retro-reflector 66, and the first upper retro-reflector 68 may be configured in the same manner as in FIG. 6.

The first harmonic generation plate 61 may be disposed between the parabolic mirror 62 and the first sensor 70. The first harmonic generation plate 61 may transmit the first sensor 70 by combining the pulse laser beam 100 reflected from the first lower retro-reflector 66 and the second lower retro-reflector 86. The first harmonic generation plate 61 may be a secondary harmonic generation plate. For example, the first harmonic generation plate 61 may include a non-linear optical plate.

The first sensor 70 may receive the pulse laser beam 100 from the first harmonic generation plate 61 to detect a dispersion value of the pulse laser beam 100. For example, the first sensor 70 may include a CCD sensor or a CMOS sensor, but the inventive concept is not limited thereto.

Figure 8:
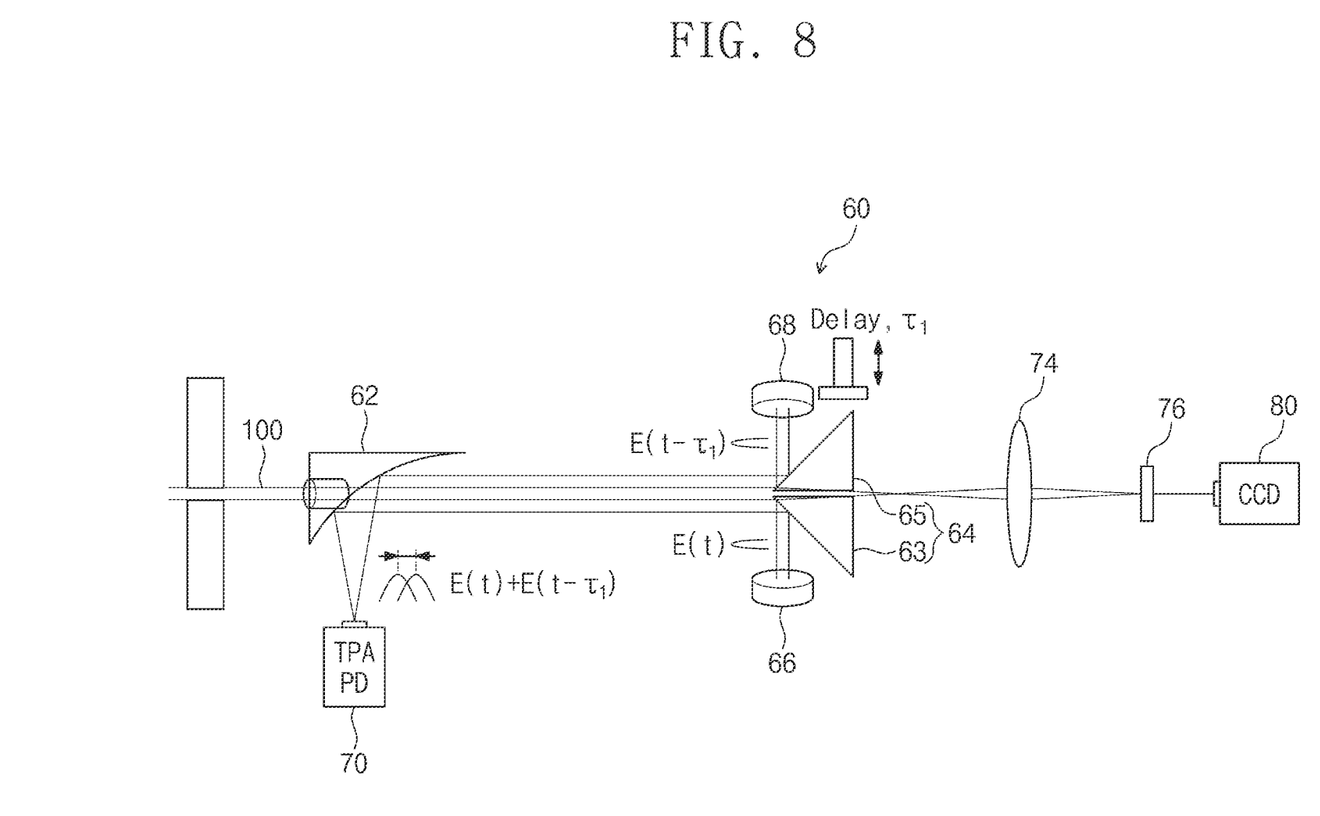
FIG. 8 is a cross-sectional view showing an example of the autocorrelator of FIG. 1.

FIG. 8 shows an example of the autocorrelator 60 of FIG. 1.

Referring to FIG. 8, the prism 64 of the autocorrelator 60 may include a lower prism 63 and an upper prism 65. For example, each of the lower prism 63 and the upper prism 65 may have a cross-sectional shape of a right triangle or an equilateral triangle. The parabolic mirror 62, the prism 64, the first lower retro-reflector 66, the first upper retro-reflector 68, and the first sensor 70 may be configured in the same manner as in FIG. 6.

The lower prism 63 may be provided below the upper prism 65. The lower prism 63 may be provided between the first lower retro-reflector 66 and the upper prism 65. The lower prism 63 may reflect a portion of the pulse laser beam 100 to the first lower retro-reflector 66, and transmit another portion of the pulse laser beam 100 to the second harmonic generation plate 76. The lower prism 63 may include BK7 glass.

The upper prism 65 may be provided above the lower prism 63. The upper prism 65 may be provided between the lower prism 63 and the first upper retro-reflector 68. The upper prism 65 may reflect another part of the pulse laser beam 100 to the first upper retro-reflector 68, and transmit another part of the pulse laser beam 100 to the second harmonic generation plate 76. The upper prism 65 may have a refractive index different from that of the lower prism 63. For example, the upper prism 65 may include fused silica.

The upper prism 65 and the lower prism 63 may generate a phase difference of the pulse laser beam 100 and may generate a phase delay time difference. That is, the second time difference may be a fixed value obtained by the difference in refractive indices of the upper prism 65 and the lower prism 63. On the other hand, the first time difference $\tau1$ may be a tuning value adjusted by the second distance between the upper prism 65 and the first upper retro-reflector 68.

The second harmonic generation plate 76 may be provided on the other side of the lower prism 63 and the upper prism 65 facing the parabolic mirror 62. The second harmonic generation plate 76 may measure the dispersion value of the pulse laser beam 100. For example, the second harmonic generation plate 76 may be a second harmonic plate. For example, the second harmonic generation plate 76 may include a non-linear optical plate, but the inventive concept is not limited thereto.

A convex lens 74 may be provided between the second harmonic generation plate 76 and the prism 64. The convex lens 74 may focus the pulse laser beam 100 on the second harmonic generation plate 76.

The second sensor 80 may be provided on the other side of the lower prism 63 and the upper prism 65 facing the parabolic mirror 62. The second sensor 80 may detect the pulse laser beam 100 to detect a dispersion value of the pulse laser beam 100. The second sensor 80 may include a CCD sensor or a CMOS sensor, but the inventive concept is not limited thereto.

Figure 9:
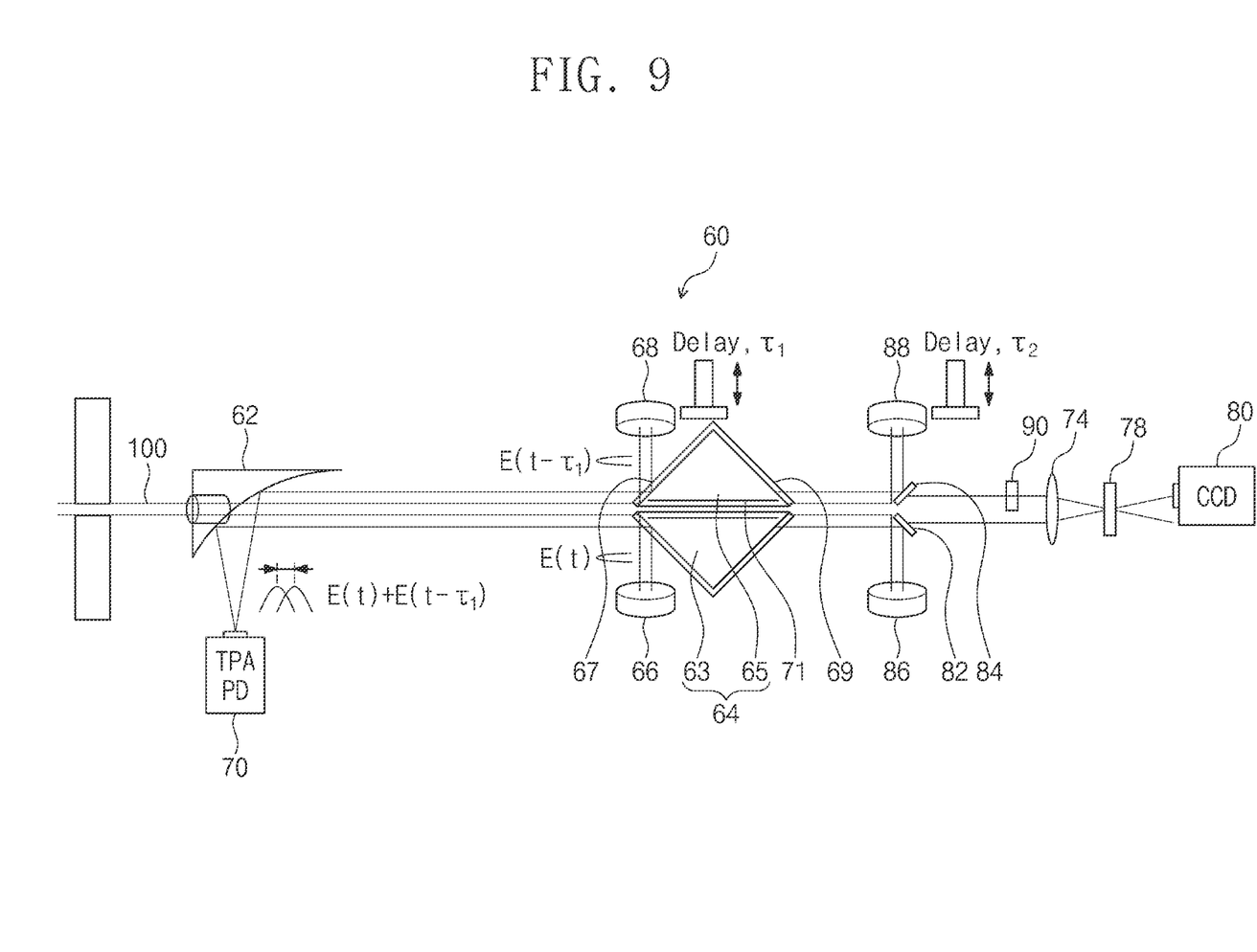
FIG. 9 is a cross-sectional view showing an example of the autocorrelator of FIG. 1.

FIG. 9 shows an example of the autocorrelator 60 of FIG. 1.

Referring to FIG. 9, the autocorrelator 60 may further include a first beam splitter 82, a second beam splitter 84, a second lower retro-reflector 86, a second upper retro-reflector 88, and a polarizing plate 90. The parabolic mirror 62, the prism 64, the first lower retro-reflector 66, the first upper retro-reflector 68, and the first sensor 70 may be configured in the same manner as in FIG. 6.

The first beam splitter 82 may be provided between the prism 64 and the second sensor 80. The first beam splitter 82 may be provided between the second lower retro-reflector 86 and the second beam splitter 84. The first beam splitter 82 may reflect a portion of the pulse laser beam 100 to the second lower retro-reflector 86 and transmit another portion of the pulse laser beam 100 to the second sensor 80. In addition, the first beam splitter 82 may reflect the pulse laser beam 100 of the second lower retro-reflector 86 to the lower prism 63.

The second beam splitter 84 may be provided between the prism 64 and the second sensor 80. The second beam splitter 84 may be provided between the second upper retro-reflector 88 and the first beam splitter 82. The second beam splitter 84 may reflect another portion of the pulse laser beam 100 to the second upper retro-reflector 88, and transmit another portion of the pulse laser beam 100 to the second sensor 80. The second beam splitter 84 may reflect the pulse laser beam 100 of the second upper retro-reflector 88 to the upper prism 65.

The second lower retro-reflector 86 may be provided below the first beam splitter 82. The second lower retro-reflector 86 may be provided at a third distance from the first beam splitter 82. The second lower retro-reflector 86 may reflect the pulse laser beam 100 to the first beam splitter 82.

The second upper retro-reflector 88 may be provided on top of the second beam splitter 84. The second upper retro-reflector 88 may be provided at a fourth distance. The fourth distance may be changed differently from the third distance. The second upper retro-reflector 88 may reflect another part of the pulse laser beam 100 to generate a second time difference ($\tau 2$) of the pulse laser beam 100. The A pulse laser beam 100 may be provided to the prism 64 and the parabolic mirror 62, and may be interfered therewith. The pulse laser beam 100 may have a first time difference $\tau 1$, a phase difference, and a second time difference $\tau 2$. A control unit (not shown) may acquire the pulse width 104 of the pulse laser beam 100 by using the detection signal of the first sensor 70.

The polarizing plate 90 may be provided between the second beam splitter 84 and the convex lens 74. The polarizing plate 90 may polarize a portion of the pulse laser beam 100 to reduce interference of the pulse laser beam 100 and increase the reliability of dispersion value measurement.

The convex lens 74, the second harmonic generation plate 76, and the second sensor 80 may be configured in the same manner as in FIG. 8.

Each of the lower prism 63 and the upper prism 65 may have a cross-sectional shape of an equilateral triangle or an isosceles triangle. According to an example, each of the lower prism 63 and the upper prism 65 may have a partially reflective coating layer 67, an anti-reflective coating layer 69, and a highly reflective coating layer. The partially reflective coating layer 67 may be provided adjacent to the first lower retro-reflector 66 and the first upper retro-reflector 68. The partially reflective coating layer 67 may be provided on one inclined surfaces of the lower prism 63 and the upper prism 65. The partially reflective coating layer 67 may increase the reflection efficiency and refractive efficiency of the pulse laser beam 100. The anti-reflective coating layer 69 may be provided adjacent to the first beam splitter 82 and the second beam splitter 84. The anti-reflective coating layer 69 may be provided on the other inclined surfaces of the lower prism 63 and the upper prism 65. The anti-reflective coating layer 69 may increase transmission efficiency and refractive efficiency of the pulse laser beam 100. The highly reflective coating layer 71 may be provided on the bottom surfaces of the lower prism 63 and the upper prism 65. The highly reflective coating layer 71 may minimize and reduce internal interference of the pulse laser beam 100 within the lower prism 63 and the upper prism 65.

As described above, the autocorrelator according to an embodiment of the inventive concept may implement the simplification of the device by using a parabolic mirror, lower and upper retro-reflectors, and a prism.

Although the embodiments of the inventive concept have been described, it is understood that the inventive concept should not be limited to these embodiments but various changes and modifications may be made by one ordinary skilled in the art within the spirit and scope of the inventive concept as hereinafter claimed.

What is claimed is:

1. An autocorrelator comprising:
a parabolic mirror configured to transmit and reflect pulse laser beam;
a prism on one side of the parabolic mirror and configured to split the pulse laser beam;
a first lower retro-reflector disposed under the prism and provided at a first distance from the prism to reflect a portion of the pulse laser beam;
a first upper retro-reflector disposed on the prism, provided at a second distance different from the first distance from the prism, and configured to reflect another portion of the pulse laser beam to generate a first time difference between pulses of the pulse laser beam; and
a first sensor disposed under the parabolic mirror and configured to receive the pulse laser beam to detect a pulse width of the pulse laser beam.

2. The autocorrelator of claim 1, wherein the first sensor comprises a two-photon sensor.

3. The autocorrelator of claim 1, further comprising a first harmonic generation plate between the parabolic mirror and the first sensor.

4. The autocorrelator of claim 1, wherein the prism comprises:
a lower prism; and
an upper prism disposed on the lower prism and having a refractive index different from that of the lower prism.

5. The autocorrelator of claim 4, wherein the lower prism comprises glass,
wherein the upper prism comprises silica.

6. The autocorrelator of claim 4, further comprising:
first and second beam splitters provided on another side of the lower prism and the upper prism facing the parabolic mirror;
a second lower retro-reflector disposed below the first and second beam splitters and provided at a third distance from the first beam splitter to reflect a portion of the pulse laser beam; and
a second upper retro-reflector disposed on the first and second beam splitters, provided at a fourth distance different from the third distance from the second beam splitter, and configured to reflect another portion of the pulse laser beam to generate a second time difference between the pulses of the pulse laser beam.

7. The autocorrelator of claim 6, further comprising a second sensor disposed on another side of the first and second beam splitters.

8. The autocorrelator of claim 7, further comprising a second harmonic generation plate disposed between the first and second beam splitters and the second sensor.

9. The autocorrelator of claim 8, further comprising a convex lens between the second harmonic generation plate and the first and second beam splitters.

10. The autocorrelator of claim 9, further comprising a polarizing plate disposed between the convex lens and the second beam splitter.

11. An autocorrelator comprising:
a parabolic mirror configured to transmit and reflect pulse laser beam;
a prism disposed on one side of the parabolic mirror to split the pulse laser beam;
a first lower retro-reflector disposed under the prism and provided at a first distance from the prism to reflect a portion of the pulse laser beam;
a first upper retro-reflector portion disposed on the prism, provided at a second distance different from the first distance from the prism, and configured to reflect another portion of the pulse laser beam to generate a first time difference between pulses of the pulse laser beam;
a first sensor disposed under the parabolic mirror and configured to receive the pulse laser beam and detect a pulse width of the pulse laser beam;
first and second beam splitters disposed on an other side of the prism facing the parabolic mirror;
a second lower retro-reflector disposed below the first and second beam splitters and provided at a third distance from the first beam splitter to reflect a portion of the pulse laser beam; and
a second upper retro-reflector disposed above the first and second beam splitters, provided at a fourth distance different from the third distance from the second beam splitter, and configured to reflect another portion of the pulse laser beam to reflect another portion of the pulse laser beam to generate a second time difference between the pulses of the pulse laser beam.

12. The autocorrelator of claim 11, wherein the prism comprises:
a lower prism; and
an upper prism disposed on the lower prism and having a refractive index different from that of the lower prism.

13. The autocorrelator of claim 12, further comprising partially reflective coating layers on one side of the lower prism and the upper prism adjacent to the first lower retro-reflector and the first upper retro-reflector.

14. The autocorrelator of claim 12, further comprising anti-reflective coating layers disposed on the other sides of the second lower retro-reflector and the lower prism and the upper prism adjacent to the second upper retro-reflector.

15. The autocorrelator of claim 12, further comprising highly reflective coating layers provided in bottoms of the lower prism and the upper prism and arranged in a direction parallel to the pulse laser beam.

16. A pulse amplifying device comprising:
a pulse oscillator configured to generate pulses of a pulse laser beam;
an expander disposed adjacent to the pulse oscillator and expanding a pulse width of the pulse laser beam;
a compressor disposed adjacent to the expander and configured to compress the pulse width of the pulse laser beam; and
an autocorrelator disposed adjacent to the compressor and configured to adjust the pulse width by measuring the pulse width,
wherein the autocorrelator comprises:
a parabolic mirror configured to transmit and reflect pulse laser beam;
a prism disposed on one side of the parabolic mirror and configured to split the pulse laser beam;
a first lower retro-reflector disposed under the prism and provided at a first distance from the prism to reflect a portion of the pulse laser beam;
a first upper retro-reflector disposed on the prism, provided at a second distance different from the first distance from the prism, and configured to reflect another portion of the pulse laser beam to generate a first time difference between pulses of the pulse laser beam upper; and
a first sensor disposed under the parabolic mirror and configured to receive the pulse laser beam to detect a pulse width of the pulse laser beam.

17. The pulse amplifying device of claim 16, further comprising an amplifier disposed between the expander and the compressor and configured to amplify an intensity of the pulse laser beam.

18. The pulse amplifying device of claim 16, wherein the prism comprises:
a lower prism; and
an upper prism disposed on the lower prism and having a refractive index different from that of the lower prism.

19. The pulse amplifying device of claim 18, wherein the lower prism comprises glass,
wherein the upper prism comprises silica.

20. The pulse amplifying device of claim 18, further comprising:
first and second beam splitters provided on other sides of the lower prism and the upper prism facing the parabolic mirror;
a second lower retro-reflector disposed below the first and second beam splitters and provided at a third distance from the first beam splitter to reflect a portion of the pulse laser beam; and
a second upper retro-reflector disposed on the first and second beam splitters, provided at a fourth distance different from the third distance from the second beam splitter, and configured to reflect another portion of the pulse laser beam to generate a second time difference between the pulses of the pulse laser beam.

* * * * *